US009560241B2

(12) United States Patent
Kitazaki et al.

(10) Patent No.: US 9,560,241 B2
(45) Date of Patent: Jan. 31, 2017

(54) INFORMATION PROCESSING APPARATUS, IMAGE PROCESSING METHOD, AND NON-TRANSITORY COMPUTER READABLE MEDIUM

(71) Applicant: FUJI XEROX CO., LTD., Tokyo (JP)

(72) Inventors: Masako Kitazaki, Kanagawa (JP); Kimitake Hasuike, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/812,680

(22) Filed: Jul. 29, 2015

(65) Prior Publication Data

US 2016/0219189 A1   Jul. 28, 2016

(30) Foreign Application Priority Data

Jan. 28, 2015   (JP) ................. 2015-013905

(51) Int. Cl.
*H04N 1/44*   (2006.01)
*H04N 1/00*   (2006.01)

(52) U.S. Cl.
CPC .......... *H04N 1/442* (2013.01); *H04N 1/00244* (2013.01); *H04N 1/00251* (2013.01); *H04N 1/4413* (2013.01); *H04N 2201/0094* (2013.01)

(58) Field of Classification Search
USPC ...................................... 358/1.14
See application file for complete search history.

(56) References Cited

U.S. PATENT DOCUMENTS

| 6,151,464 A | * | 11/2000 | Nakamura | ......... G03G 15/5091 399/79 |
| 8,830,514 B2 | | 9/2014 | Sakurai | |
| 2013/0194626 A1 | * | 8/2013 | Sakurai | ................. G06F 3/1296 358/1.15 |
| 2015/0049361 A1 | * | 2/2015 | Hirose | .................. G06F 3/1204 358/1.15 |
| 2015/0181111 A1 | * | 6/2015 | Stewart | .............. H04N 5/23219 348/211.8 |

FOREIGN PATENT DOCUMENTS

| JP | 2007-280390 A | 10/2007 |
| JP | 2013-012039 A | 1/2013 |
| JP | 2013-156702 A | 8/2013 |

* cited by examiner

*Primary Examiner* — Ngon Nguyen
(74) *Attorney, Agent, or Firm* — Oliff PLC

(57) ABSTRACT

An information processing apparatus includes a detector, a selection unit, and a presentation unit. The detector detects that a user has a document from an image of the user. The selection unit selects, in a case where it is detected by the detector that the user has a document, an image processing apparatus with an image reading function. The presentation unit presents the image processing apparatus selected by the selection unit to the user.

12 Claims, 10 Drawing Sheets

FIG. 11

Table 1100:

| IMAGE PROCESSING APPARATUS ID (1110) | LOCATION (1120) | SPECS (1130) | JOB SCHEDULE (1140) |
|---|---|---|---|
| MACHINE 1 | SECOND FLOOR, SOUTH | SCAN: COLOR OK, A3, 10 SHEETS/MIN PRINT: COLOR OK, A3, 30 SHEETS/MIN | 1: 14:45 : EXECUTING: PRINT: 50 SHEETS: 10 MINUTES 2: (14:55) : STANDBY. SCAN: 100 SHEETS: 15 MINUTES 3: 15:00 : SCHEDULED: PRINT: 200 SHEETS: 15 MINUTES |
| MACHINE 2 | SECOND FLOOR, NORTH | SCAN: COLOR OK, A4, 50 SHEETS/MIN PRINT: BLACK AND WHITE, A4, 100 SHEETS/MIN | 1: 14:45 : EXECUTING: SCAN: 10 SHEETS: 2 MINUTES 2: 14:47 : SCHEDULED: PRINT: 500 SHEETS: 20 MINUTES |
| MACHINE 3 | THIRD FLOOR, WEST | SCAN: UNAVAILABLE PRINT: COLOR OK, A3, 50 SHEETS/MIN | 1: 14:45 : EXECUTING: PRINT: 10 SHEETS: 2 MINUTES |
| MACHINE 4 | THIRD FLOOR, EAST | DURING MAINTENANCE | |

| USER LOCATION VS IMAGE PROCESSING APPARATUS LOCATION (1150) | USER'S JOB VS SPECS (1160) | ESTIMATED START TIME TO ESTIMATED COMPLETION TIME (1170) | ORDER OF RECOMMENDATION (1180) |
|---|---|---|---|
| 2nd | ○ | 15:15 TO 15:27 | 2nd |
| 1st | × | | × |
| 3rd | ○ | 14:47 TO 15:02 | 1st |
| 4th | × | | × |

INFORMATION PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-013905 filed Jan. 28, 2015.

BACKGROUND

Technical Field

The present invention relates to an information processing apparatus, an image processing method, and a non-transitory computer readable medium.

SUMMARY

According to an aspect of the invention, there is provided an information processing apparatus including a detector, a selection unit, and a presentation unit. The detector detects that a user has a document from an image of the user. The selection unit selects, in a case where it is detected by the detector that the user has a document, an image processing apparatus with an image reading function. The presentation unit presents the image processing apparatus selected by the selection unit to the user.

BRIEF DESCRIPTION OF THE DRAWINGS

An exemplary embodiment of the present invention will be described in detail based on the following figures, wherein:

FIG. 11 is an illustrative diagram illustrating an example of a data structure of a priority-added table.

DETAILED DESCRIPTION

In the following, an example of a preferable exemplary embodiment for realizing the present invention will be described in accordance with the drawings.

Figure 1:
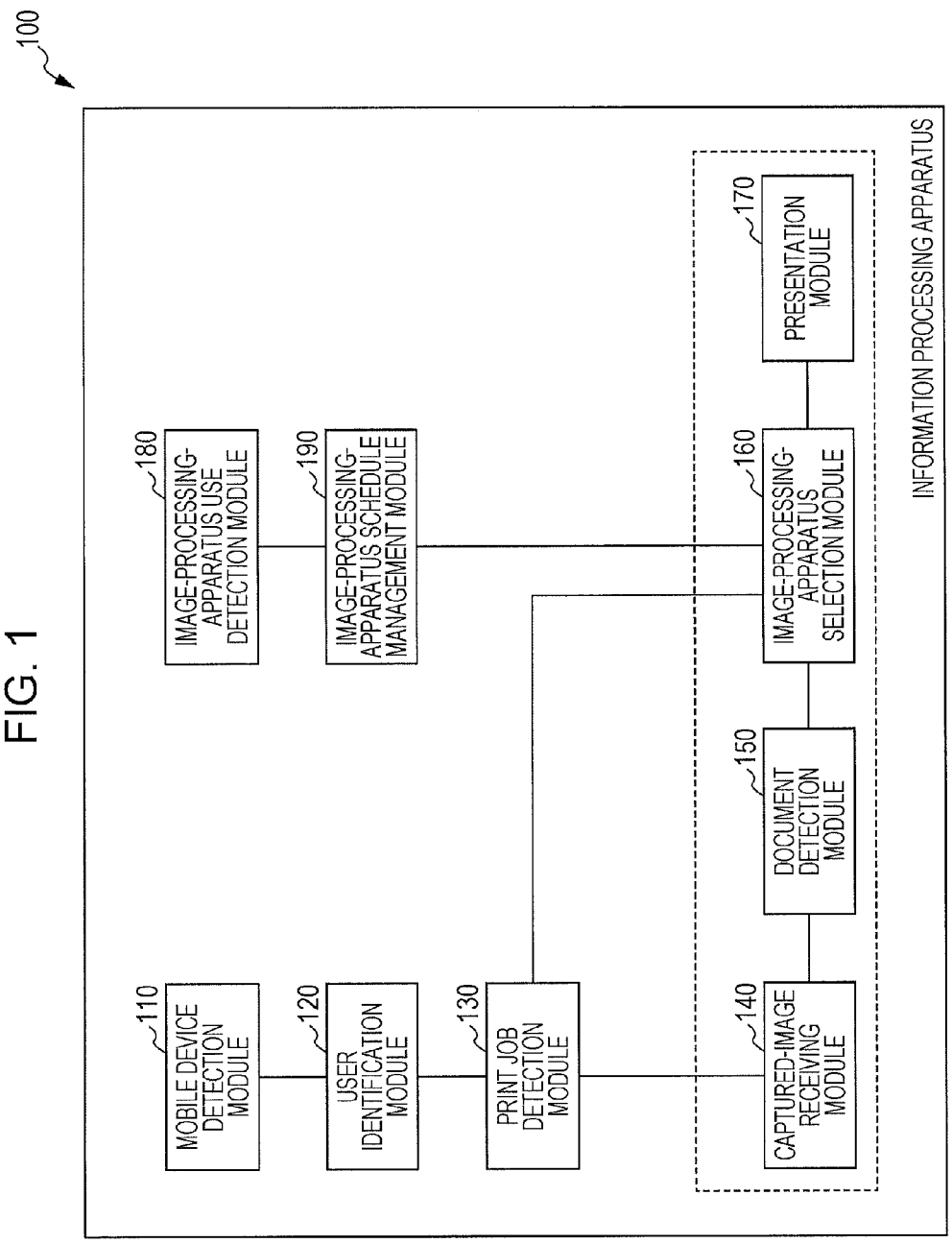
FIG. 1 is a schematic module configuration diagram of an example of the configuration of a present exemplary embodiment.

FIG. 1 illustrates a schematic module configuration diagram of an example of the configuration of the present exemplary embodiment.

Note that modules generally refer to parts that are logically separable such as software (computer programs), hardware, and the like. Thus, modules in the present exemplary embodiment refer not only to modules in a computer program but also modules in a hardware configuration. Thus, the present exemplary embodiment also describes computer programs that function as these modules (a program for causing a computer to execute each procedure, a program for causing the computer to function as each unit, and a program for causing the computer to realize each function), a system, and a method. Note that, for convenience's sake in terms of description, "store", "cause . . . to store" and expressions similar thereto are used. These expressions mean that, in the case where an exemplary embodiment is a computer program, "cause a storage device to store" or "performs control such that a storage device is caused to store . . . ". There may be a one-to-one correspondence between modules and functions. When modules are mounted, one module may be constituted by one program or plural modules may be constituted by one program. Alternatively, one module may be constituted by plural programs. Moreover, plural modules may be executed by one computer or one module may be executed by plural computers, which are computers in a distributed environment or a parallel processing environment. Note that one module may include another module. In addition, in the following, "connection" may be used not only for a physical connection but also for a logical connection (transmitting/receiving of data, instructions, a reference relationship between pieces of data, and the like). "Predetermined" means something is determined before a target process is performed, and also means that something is determined not only before a process according to the present exemplary embodiment starts but also after the process according to the present exemplary embodiment starts and before a target process starts, depending on a status or a state at that point in time or in accordance with a status or a state until that point in time. In the case where there are plural "predetermined values", the predetermined values may differ from one another or two or more of the predetermined values (as a matter of course, including all the predetermined values) may be the same. In addition, a description meaning "in the case of A, B is performed" is used to mean that "It is determined whether or not . . . is A. In the case where it is determined that . . . is A, B is performed". Note that cases are excluded where a determination as to whether or not . . . is A is unnecessary.

In addition, a system or an apparatus may not only be constituted by plural computers, hardware devices, apparatuses, and the like connected through a communication unit such as a network (including one-to-one correspondence communication connection) but also be realized using one computer, a hardware device, an apparatus, or the like. An "apparatus" and a "system" are used as words having the same meaning. As a matter of course, the "system" does not include just a social "mechanism" (a social system), which is man-made arrangements.

For each process performed by each module or for each process in the case where plural processes are performed in a module, target information is read from a storage device.

After the process is performed, a processing result is written into the storage device. Thus, a description may be omitted as to reading of target information from the storage device before a process is performed and as to writing of target information into the storage device after a process is performed. Note that here a storage device may include a hard disk, a random access memory (RAM), an external storage medium, a storage device connected through a communication line, a register included in a central processing unit (CPU), and the like.

An information processing apparatus 100, which is the present exemplary embodiment, presents an image processing apparatus that a user is going to use to the user. As illustrated in the example of FIG. 1, the information processing apparatus 100 includes a mobile device detection module 110, a user identification module 120, a print job detection module 130, a captured-image receiving module 140, a document detection module 150, an image-processing-apparatus selection module 160, a presentation module 170, an image-processing-apparatus use detection module 180, and an image-processing-apparatus schedule management module 190.

Note that, other than the module configuration illustrated in FIG. 1, the information processing apparatus 100 may also be constituted by the captured-image receiving module 140, the document detection module 150, the image-processing-apparatus selection module 160, and the presentation module 170.

In an office building or the like where plural image processing apparatuses are present, there is a demand that a user wants to know an image processing apparatus that is capable of finishing a job, which is issued by the user, fastest and that is most appropriate for the job from the place where the user is currently at, in accordance with the characteristics of the job issued by the user (either scan or print, a workload (the number of pages of a document or the like), a sheet size, color or black and white, finishing performed as postprocessing, and the like). Here, examples of such an image processing apparatus are a copier, a fax, a scanner, a printer, a multifunction machine (an image processing apparatus having two or more functions of a scanner, a printer, a copier, a fax, and the like), and the like.

The mobile device detection module 110 is connected to the user identification module 120. The mobile device detection module 110 detects a mobile terminal apparatus (hereinafter also referred to as a mobile device) that a user has. Here, such a mobile terminal apparatus may be any mobile terminal apparatus that may determine the location of the user who has the mobile terminal apparatus (the location of the mobile terminal apparatus). Furthermore, the mobile terminal apparatus may also be a mobile terminal apparatus that may identify the user. Examples of such a mobile terminal apparatus are mobile phones (including smartphones), IC cards, notebook PCs, and the like. In addition, a Global Positioning System (GPS) receiver may also be included. To detect a location, for example, location information output by a GPS receiver, location information on base stations used in a mobile phone network, and the like are used. For example, in the case where a mobile terminal apparatus has a function through which the mobile terminal apparatus serves as a WiFi terminal, when the user enters a WiFi area, a user ID is extracted from the mobile identification (ID) of the mobile terminal apparatus that the user has and the location of the user is determined using the location of a WiFi station.

Figure 6:
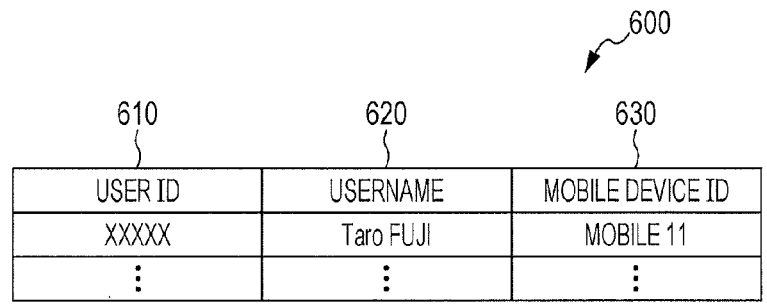
FIG. 6 is an illustrative diagram illustrating an example of a data structure of a user table.

The user identification module 120 is connected to the mobile device detection module 110 and the print job detection module 130. The user identification module 120 identifies a user. User identification may be performed, for example, using information with which a user may be identified, the information being received from their mobile terminal apparatus detected by the mobile device detection module 110. In addition, for example, a user may also be identified using a user table 600. FIG. 6 is an illustrative diagram illustrating an example of a data structure of the user table 600. The user table 600 includes a user ID field 610, a username field 620, and a mobile device ID field 630. In the present exemplary embodiment, the user ID field 610 stores information used to uniquely identify users (user IDs). The username field 620 stores usernames associated with the user IDs. The mobile device ID field 630 stores mobile IDs of mobile terminal apparatuses that the users identified by the user IDs have.

In addition, the user identification module 120 may extract a user ID by extracting the image of a face of a user from an image captured using an image capturing device and by performing face recognition without using the mobile device detection module 110. Examples of such an image capturing device are a 2D camera used to capture still or moving images, a 3D camera, a thermal camera, an omni-directional camera, and the like. In addition, the image capturing device may be a fixed image capturing device or an image capturing device whose angle, position, and the like may be changed. The image capturing device may be installed near the place where an image processing apparatus is installed, in a passage to an image processing apparatus, or the like. The image capturing device may also be installed at an image processing apparatus. In addition, a user may also be identified using an entry-exit detection apparatus called a flapper gate or the like. Specifically, information read by an IC card reader or the like is used.

In addition, in the case where the user identification module 120 has identified a user from an image captured by an image capturing device without using the mobile device detection module 110, the location of the user is calculated on the basis of the location where the image capturing device is installed. For example, the installation position of the image capturing device may be treated as the location of the user. Alternatively, the location of the user may be determined by calculating the distance and direction from the image capturing device using the size and position of a captured image of the user. In addition, in the case where a user has been identified using an entry-exit detection apparatus or the like, the location of the user is determined from the location of the entry-exit detection apparatus or the like.

Note that an image capturing device may be designed such that in the case where a person presence sensor is installed and a user is detected by the person presence sensor, the image capturing device captures an image of the user.

The print job detection module 130 is connected to the user identification module 120, the captured-image receiving module 140, and the image-processing-apparatus selection module 160. The print job detection module 130 detects a print command (hereinafter also referred to as a print job) issued by a user identified by the user identification module 120. For example, a print job corresponding to a target user ID is extracted using a correspondence table expressing the relationship between user IDs and print jobs, the correspondence table being managed by a print server. As a matter of course, the print job includes information such as a print sheet size, simplex printing or duplex printing, black-and-white printing or color printing, and the like.

The captured-image receiving module 140 is connected to the print job detection module 130 and the document detection module 150. The captured-image receiving module 140 receives images from an image capturing device that captures images of users. A captured image is received from the above-described image capturing device.

The document detection module 150 is connected to the captured-image receiving module 140 and the image-processing-apparatus selection module 160. The document detection module 150 detects that a user has a document from an image of the user received by the captured-image receiving module 140. For example, an image portion corresponding to the user is extracted from the image using an existing technology and it is determined whether or not a hand of the user has a document. Whether or not an object the hand has is a document is determined in accordance with the color and size (the relative size of the object with respect to a face, a hand, or the like of the user) of the document or the like. Note that not only one image but also plural images captured on a time-series basis may be used for analysis.

The image-processing-apparatus selection module 160 is connected to the print job detection module 130, the document detection module 150, the presentation module 170, and the image-processing-apparatus schedule management module 190. In the case where the document detection module 150 detects that the user has a document, the image-processing-apparatus selection module 160 selects image processing apparatuses with image reading functions. Here, the "image reading functions" are so-called scan functions. Note that, to trigger selection of such an image processing apparatus, the conditions may be imposed that the user has a document and that a toe of the user points in the direction toward an image processing apparatus. The direction in which the toe points is detected using an existing image processing technology. Certain conditions may also be imposed using plural images captured on a time-series basis that the toe points in the direction toward the image processing apparatus for a predetermined time period or longer. Certain conditions may also be imposed that the user has a document and the user is in a hurry (for example, in the case where it is detected from an image (or plural images) that the user is running or walking at a speed faster than the normal walking speed). Certain conditions may also be imposed that the user has a document, the user's action pattern matches the user's action pattern performed in the past (for example, in the case where the user walks by a certain place during a certain time frame, an exemplary action pattern is that reading is performed using an image processing apparatus), and the like.

In addition to the condition "presence of an image reading function", the following information may also be used as conditions for selection of such an image processing apparatus using the image-processing-apparatus selection module 160: the distance between a target user and an image processing apparatus (an image processing apparatus close to the target user is selected); a use state of an image processing apparatus (an image processing apparatus that is currently not used is selected); and schedule information on an image processing apparatus (an image processing apparatus is selected for which a job such as a print job has not been scheduled in near future (a predetermined time period from the present)). Certain conditions may also be imposed that in the case where the document the user has is a color document, an image processing apparatus to be selected is capable of performing color reading as reading performance. Certain conditions may also be imposed that in the case where the size of a document the user has is detected, an image processing apparatus to be selected is capable of reading sheets of the size. Certain conditions may also be imposed that in the case where the number of pages of a document the user has is detected (for example, the thickness of a bundle of documents is detected by performing image analysis, and the number of pages is calculated by dividing the detected thickness by the thickness of a predetermined sheet) and where the number of pages is determined to be greater than or equal to a predetermined number of pages, the reading speed of an image processing apparatus to be selected is greater than or equal to a predetermined value. Certain conditions may also be imposed that in the case where a user is identified, the user's schedule information is acquired, and an event (a meeting or the like) is scheduled within a time period from the present, the reading speed of an image processing apparatus to be selected is greater than or equal to a predetermined value.

In addition, in the case where the user identified by the user identification module 120 has issued a print command, the image-processing-apparatus selection module 160 may select image processing apparatuses with processing performance indicated by the print command. Here, the "processing performance indicated by the print command" is extracted from information included in a print job detected by the print job detection module 130 as described above (a print sheet size, simplex printing or duplex printing, and the like).

Furthermore, in the case where the user identified by the user identification module 120 has issued a print command and it is detected that the user has a document, the image-processing-apparatus selection module 160 may select image processing apparatuses with image reading functions and with processing performance indicated by the print command.

In addition, in the case where the user identified by the user identification module 120 has issued plural print commands, the image-processing-apparatus selection module 160 may select image processing apparatuses with processing performance indicated by all the plural print commands.

In addition, in the case where image processing apparatuses have image reading functions and image output functions, the following process may also be performed. In the case where image processing apparatuses with image reading functions are to be selected, the image-processing-apparatus selection module 160 may treat, as selection targets, image processing apparatuses whose image output functions are used but whose image reading functions are not used. Alternatively, in the case where image processing apparatuses with image output functions are to be selected, the image-processing-apparatus selection module 160 may treat, as selection targets, image processing apparatuses whose image reading functions are used but whose image output functions are not used. Note that the "image output functions" are so-called printout functions.

In addition, in the case where the user has selected a certain image processing apparatus so as to use the certain image processing apparatus, when the image processing apparatus is in a sleep state (a state in a power saving mode or the like), the image-processing-apparatus selection module 160 may perform control such that the image processing apparatus is caused to enter a standby state, in which the image processing apparatus is operable. In addition, in the case where the image processing apparatus is used by another user, control may also be performed such that the target user's job is scheduled for the image processing apparatus.

Figure 7:
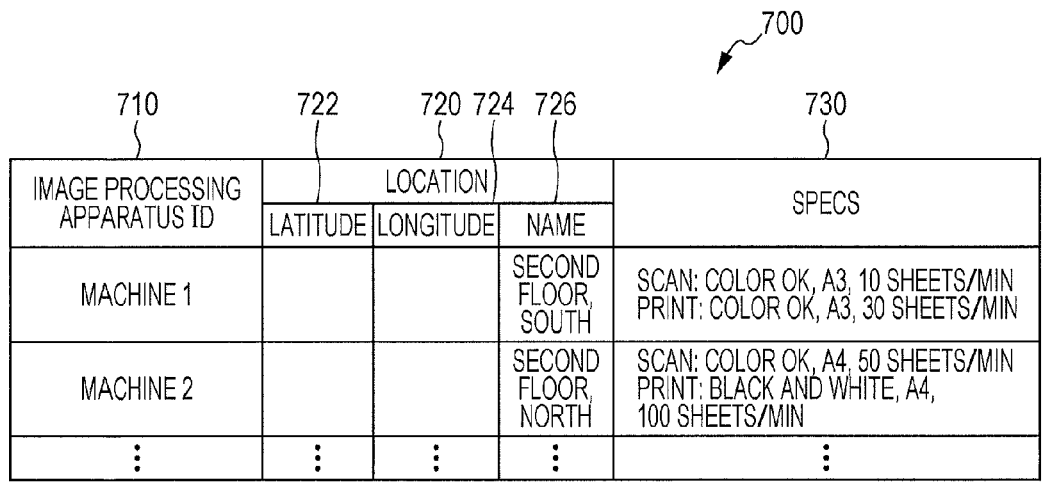
FIG. 7 is an illustrative diagram illustrating an example of a data structure of an image processing apparatus table.

Note that the image-processing-apparatus selection module 160 acquires, from a server that manages image processing apparatuses, information on image processing apparatuses. For each image processing apparatus, the image-processing-apparatus selection module 160 acquires the location of the image processing apparatus, performance information (speed, size, color, finishing, and the like), consumption information (the number of sheets, the amount of toner, the number of years the drum has been used, and the like), an error occurring situation, a maintenance state, customer information, and the like. For example, an image processing apparatus table 700 is acquired. FIG. 7 is an illustrative diagram illustrating an example of a data structure of the image processing apparatus table 700. The image processing apparatus table 700 includes an image processing apparatus ID field 710, a location field 720, and a specs field 730. The location field 720 includes a latitude field 722, a longitude field 724, and a name field 726. In the present exemplary embodiment, the image processing apparatus ID field 710 stores information used to uniquely identify image processing apparatuses (image processing apparatus IDs). The location field 720 stores the locations where the image processing apparatuses are installed. The latitude field 722 stores latitudes of the locations. The longitude field 724 stores longitudes of the locations. The name field 726 stores names of the locations. The specs field 730 stores specs of the image processing apparatuses. In addition to these fields, there may also be provided fields for storing consumption information, error occurring situations, maintenance states, customer information, and the like. The example of FIG. 7 indicates that a machine 1 is located south on the second floor and the machine 1 has the following specs, as its performance. Scan: color OK, A3, 10 sheets/min, and print: color OK, A3, 30 sheets/min. The example of FIG. 7 also indicates that a machine 2 is located north on the second floor and the machine 2 has the following specs, as its performance. Scan: color OK, A4, 50 sheets/min, and print: black-and-white, A4, 100 sheets/min.

When an image processing apparatus is to be selected by the image-processing-apparatus selection module 160, the image-processing-apparatus selection module 160 may also perform image-processing-apparatus selection using the location of each image processing apparatus, the performance information and consumption information on the image processing apparatus, and schedule information obtained from the image-processing-apparatus schedule management module 190.

The presentation module 170 is connected to the image-processing-apparatus selection module 160. The presentation module 170 presents an image processing apparatus selected by the image-processing-apparatus selection module 160 to a user. Such presentation is performed by using light of a lamp or the like (a lamp of an image processing apparatus that has been selected is switched on, and the user is notified of that the image processing apparatus has been selected), by displaying certain information on a display device such as a liquid crystal display, or by performing output vocally using a speaker, an earphone, or the like. Alternatively, such presentation may be performed using a combination of some or all of these. In addition, in the case where the user has a portable information terminal, the display device of the portable information terminal may also be used as the display device. Alternatively, as the display device, a display device such as a panel or the like included in an image processing apparatus, a display device such as a digital signage apparatus or the like, or a combination of these display devices may also be used.

Furthermore, in the case where an image processing apparatus with an image reading function is to be selected, when an image processing apparatus is selected whose image output function is used but whose image reading function is not used, a display device of the image processing apparatus may also be caused to display a message "a person who is going to use this scanner is coming now".

Furthermore, in the case where an image processing apparatus with an image output function is to be selected, when an image processing apparatus is selected whose image reading function is used but whose image output function is not used, the display device of the image processing apparatus may also be caused to display a message "a person who is going to use this printer is coming now".

The image-processing-apparatus use detection module 180 is connected to the image-processing-apparatus schedule management module 190. The image-processing-apparatus use detection module 180 detects that a certain image processing apparatus is used by a certain user. For example, the image-processing-apparatus use detection module 180 receives, from each image processing apparatus, a notification that the image processing apparatus is used by a certain user. Alternatively, a command issued to a certain image processing apparatus by a certain user using a mobile device (scheduling or the like) may also be detected. In addition, when the distance between a certain user and a certain image processing apparatus becomes shorter than or equal to a predetermined distance, it may be considered that the image processing apparatus is to be used. The location of a user is detected, as described above, by performing mobile-device location detection, captured-image analysis, or the like.

Figure 8:
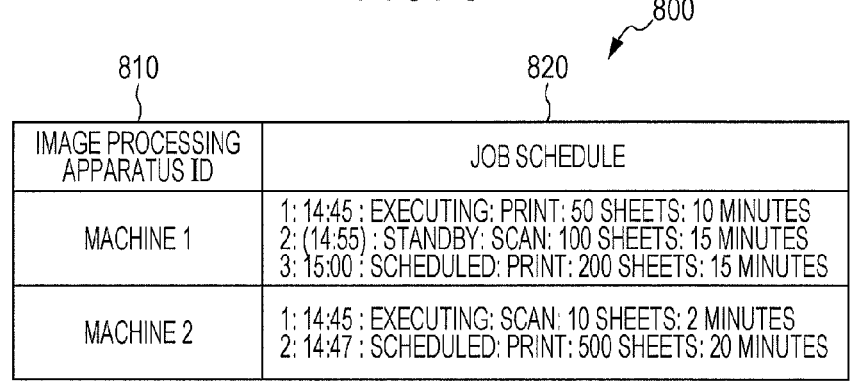
FIG. 8 is an illustrative diagram illustrating an example of a data structure of a job schedule table.

The image-processing-apparatus schedule management module 190 is connected to the image-processing-apparatus selection module 160 and the image-processing-apparatus use detection module 180. The image-processing-apparatus schedule management module 190 manages current use states of the respective image processing apparatuses and print-job schedules (including job schedules for jobs spooled in the respective image processing apparatuses, information managed by a scheduler server for the image processing apparatuses, and the like). For example, management is performed using a job schedule table 800. FIG. 8 is an illustrative diagram illustrating an example of a data structure of the job schedule table 800. The job schedule table 800 includes an image processing apparatus ID field 810 and a job schedule field 820. The image processing apparatus ID field 810 stores image processing apparatus IDs. The job schedule field 820 stores job schedules of image processing apparatuses having the image processing apparatus IDs. For example, a schedule number: a start time (an estimated start time): a state: a job type: a job amount: the time required (which may also be a completion time) is stored as schedule information.

Figure 2:
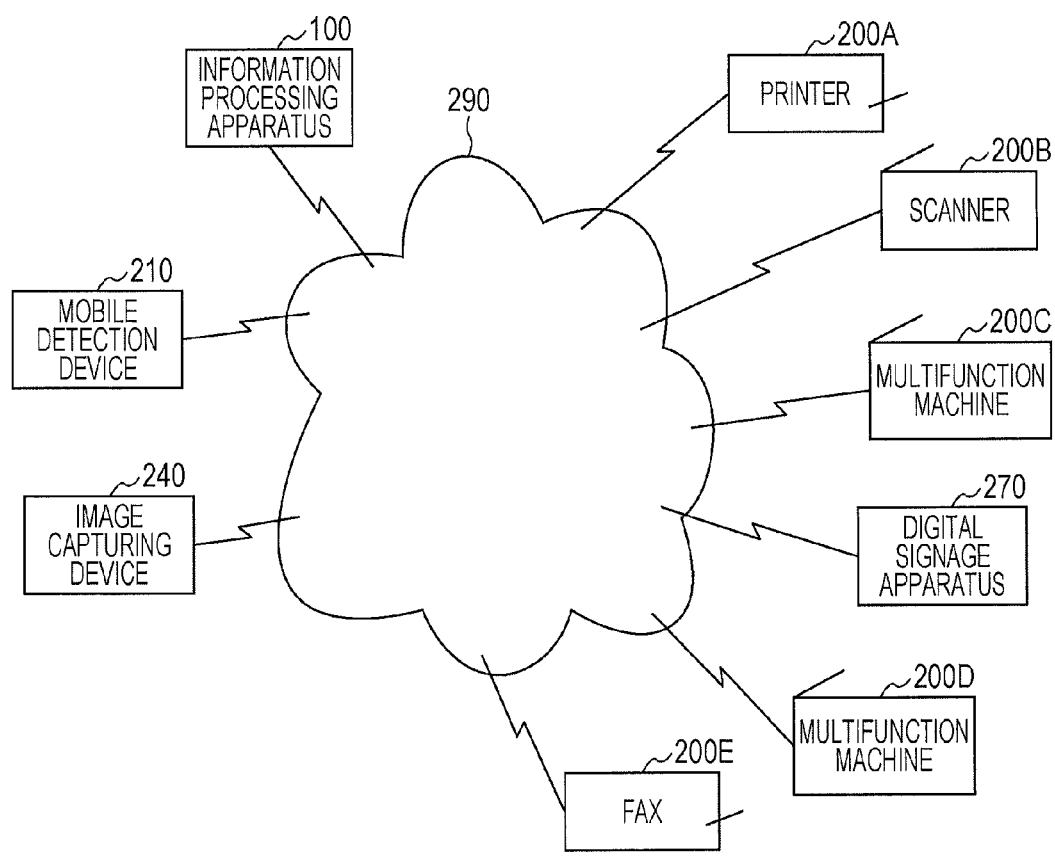
FIG. 2 is an illustrative diagram illustrating an example of a system configuration using the present exemplary embodiment.

FIG. 2 is an illustrative diagram illustrating an example of a system configuration using the present exemplary embodiment.

The information processing apparatus 100, a printer 200A, a scanner 200B, a multifunction machine 200C, a multifunction machine 200D, a fax 200E, a mobile detection device 210, an image capturing device 240, and a digital signage apparatus 270 are connected to one another via communication lines 290. The printer 200A, the scanner 200B, the multifunction machine 200C, the multifunction machine 200D, and the fax 200E serve as image processing apparatuses. A user uses any one of these image processing apparatuses. A user has the mobile detection device 210 (the user may be a user who does not have the mobile detection device 210), and the image capturing device 240 captures an image of the user. Note that there may also be provided plural mobile detection devices 210, plural image capturing devices 240, and plural information processing apparatuses 100.

Figure 3:
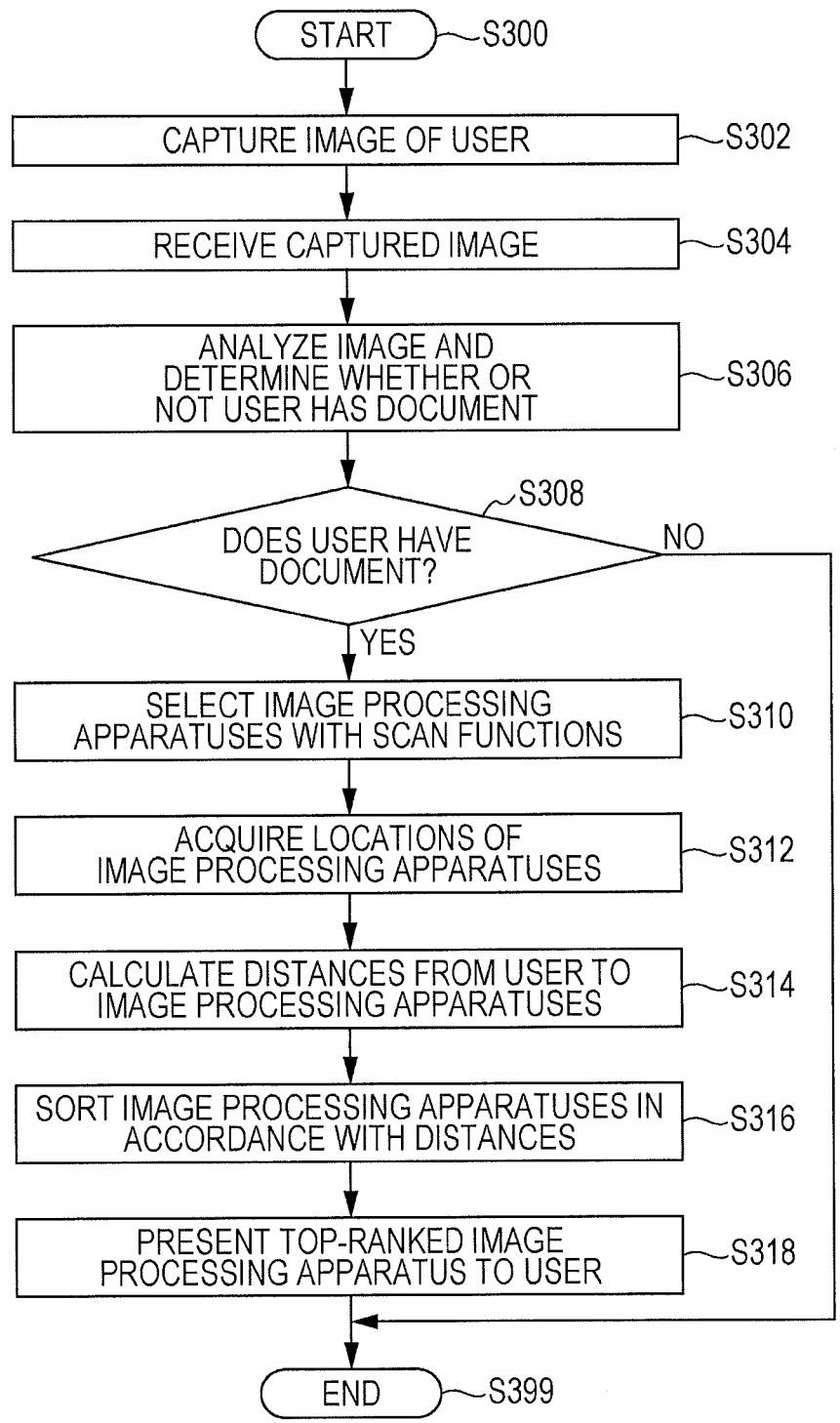
FIG. 3 is a flowchart illustrating an example of a process according to the present exemplary embodiment.

FIG. 3 is a flowchart illustrating an example of a process according to the present exemplary embodiment. FIG. 3 mainly illustrates examples of processes performed by the captured-image receiving module 140, the document detection module 150, the image-processing-apparatus selection module 160, and the presentation module 170 included in the information processing apparatus 100.

In step S302, the image capturing device 240 captures an image of a user.

In step S304, the captured-image receiving module 140 receives the captured image.

In step S306, the document detection module 150 analyzes the captured image and determines whether or not the user has a document.

In the case where the document detection module 150 determines in step S308 that the user has a document in accordance with the result obtained in step S306, the process proceeds to step S310. Otherwise the process ends (step S399).

In step S310, the image-processing-apparatus selection module 160 selects image processing apparatuses with scan functions.

In step S312, the image-processing-apparatus selection module 160 acquires the locations of the image processing apparatuses.

In step S314, the image-processing-apparatus selection module 160 calculates the distances from the user to the image processing apparatuses.

In step S316, the image-processing-apparatus selection module 160 sorts the image processing apparatuses in accordance with the distances in ascending order.

In step S318, the presentation module 170 presents the top-ranked image processing apparatus (or plural image processing apparatuses at higher ranks) to the user.

Figure 4:
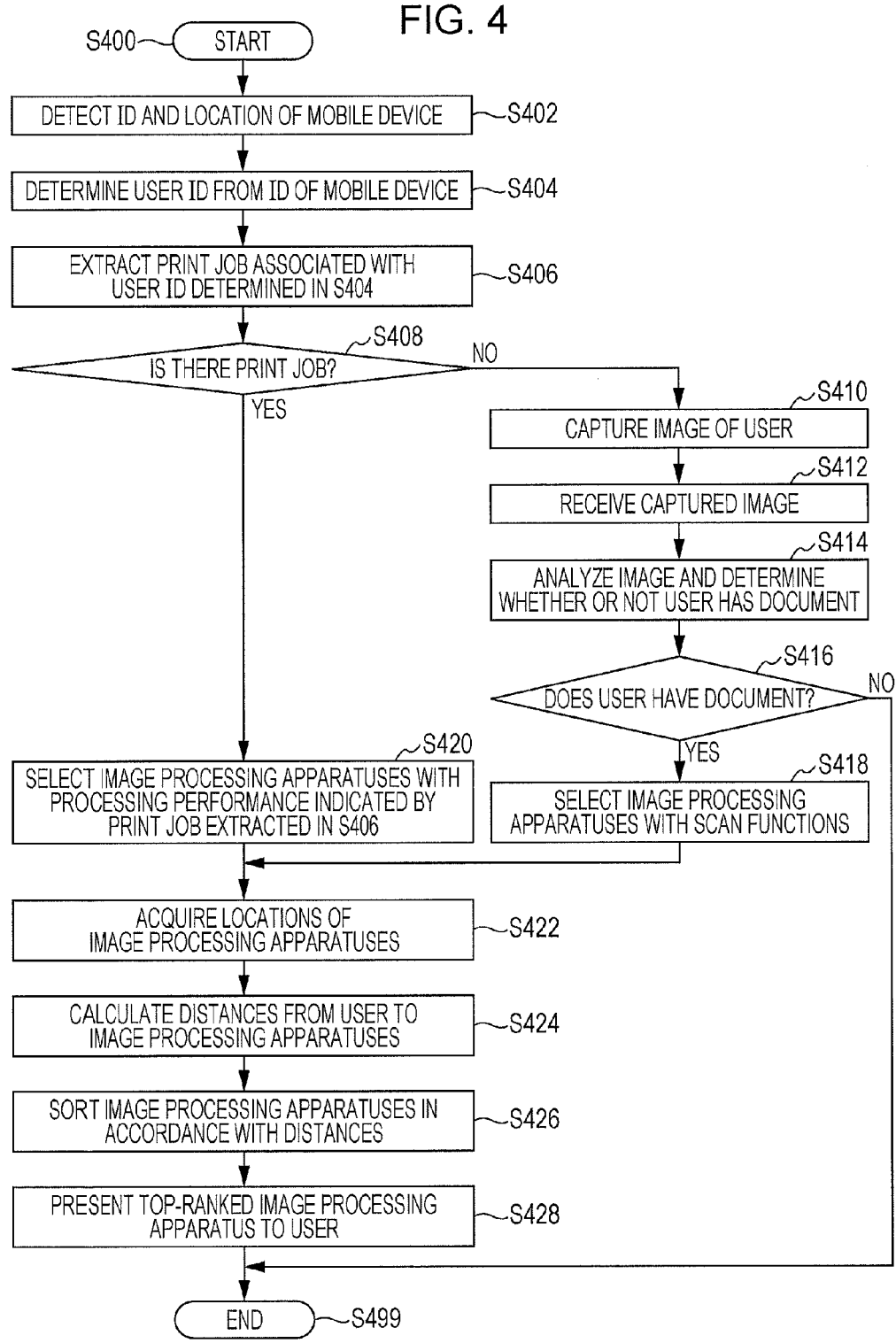
FIG. 4 is a flowchart illustrating an example of a process according to the present exemplary embodiment.

FIG. 4 is a flowchart illustrating an example of a process according to the present exemplary embodiment.

In step S402, the mobile device detection module 110 detects an ID and the location of a mobile device.

In step S404, the user identification module 120 determines a user ID from the ID of the mobile device.

In step S406, the print job detection module 130 extracts a print job associated with the user ID determined in step S404.

In step S408, the print job detection module 130 determines whether or not there is a print job. In the case where there is a print job, the process proceeds to step S420. Otherwise the process proceeds to step S410.

In step S410, the image capturing device 240 captures an image of a user.

In step S412, the captured-image receiving module 140 receives the captured image.

In step S414, the document detection module 150 analyzes the captured image and determines whether or not the user has a document.

In the case where the document detection module 150 determines in step S416 that the user has a document in accordance with the result obtained in step S414, the process proceeds to step S418. Otherwise the process ends (step S499).

In step S418, the image-processing-apparatus selection module 160 selects image processing apparatuses with scan functions.

In step S420, the image-processing-apparatus selection module 160 selects an image processing apparatus with processing performance indicated by the print job extracted in step S406. Here, plural image processing apparatuses may also be selected.

In step S422, the image-processing-apparatus selection module 160 acquires the locations of the image processing apparatuses.

In step S424, the image-processing-apparatus selection module 160 calculates the distances from the user to the image processing apparatuses.

In step S426, the image-processing-apparatus selection module 160 sorts the image processing apparatuses in accordance with the distances in ascending order.

In step S428, the presentation module 170 presents the top-ranked image processing apparatus (or plural image processing apparatuses at higher ranks) to the user.

Figure 5:
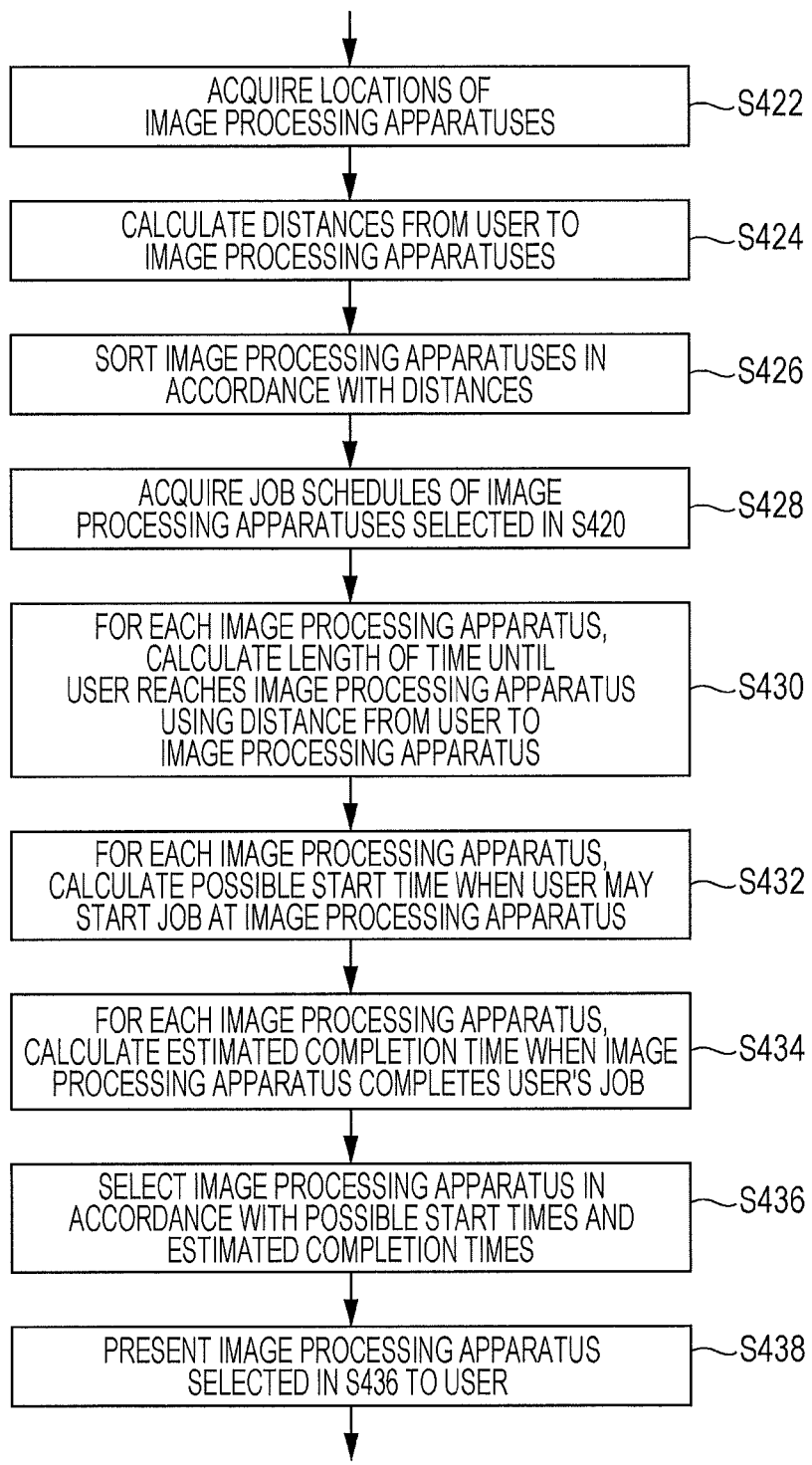
FIG. 5 is a flowchart illustrating an example of a process according to the present exemplary embodiment.

FIG. 5 is a flowchart illustrating an example of a process according to the present exemplary embodiment. Processing in steps S422 to S428 of the flowchart illustrated in the example of FIG. 4 may be changed as in the flowchart illustrated in the example of FIG. 5.

In step S422, the image-processing-apparatus selection module 160 acquires the locations of the image processing apparatuses.

In step S424, the image-processing-apparatus selection module 160 calculates the distances from the user to the image processing apparatuses.

In step S426, the image-processing-apparatus selection module 160 sorts the image processing apparatuses in accordance with the distances in ascending order.

In step S428, the image-processing-apparatus schedule management module 190 acquires job schedules of the image processing apparatuses selected in step S420.

In step S430, the image-processing-apparatus selection module 160 calculates, for each image processing apparatus, the length of time until the user reaches the image processing apparatus using the distance from the user to the image processing apparatus. For example, the length of time may be calculated assuming that the user walks at a predetermined speed or may also be calculated using a certain speed, which has been calculated from images captured on a time-series basis.

In step S432, the image-processing-apparatus selection module 160 calculates, for each image processing apparatus, a possible start time when the user may start a job (a scan job, a print job) at the image processing apparatus. The possible start time is obtained by adding a predetermined time period (a time period required to prepare for a scan (setting a document or the like), to select a print job, or the like) to the time when the user reaches the image processing apparatus.

In step S434, the image-processing-apparatus selection module 160 calculates, for each image processing apparatus, an estimated completion time when the image processing apparatus completes the user's job. The estimated completion time may be obtained by adding a predetermined time period to the time calculated in step S432. In the case of a print job, the estimated completion time may also be obtained by performing calculation taking the print job and the performance (print speed) of the image processing apparatus into consideration. In the case of a scan job, as described above, the number of pages of the document is detected, and the estimated completion time may also be obtained by performing calculation taking the number of pages and the performance (scan speed) of the image processing apparatus into consideration.

In step S436, the image-processing-apparatus selection module 160 selects an image processing apparatus (or plural image processing apparatuses) in accordance with the possible start times and the estimated completion times. Specifically, available time periods (idle time periods) of the image processing apparatuses are extracted from the job schedules acquired in step S428. For each image processing apparatus, when the possible start time calculated in step S432 and the estimated completion time calculated in step S434 of the image processing apparatus are included in an available time period associated with the image processing apparatus among the available time periods, the image processing apparatus is selected.

In step S438, the presentation module 170 presents image processing apparatuses selected in step S436 to the user.

Figure 9:
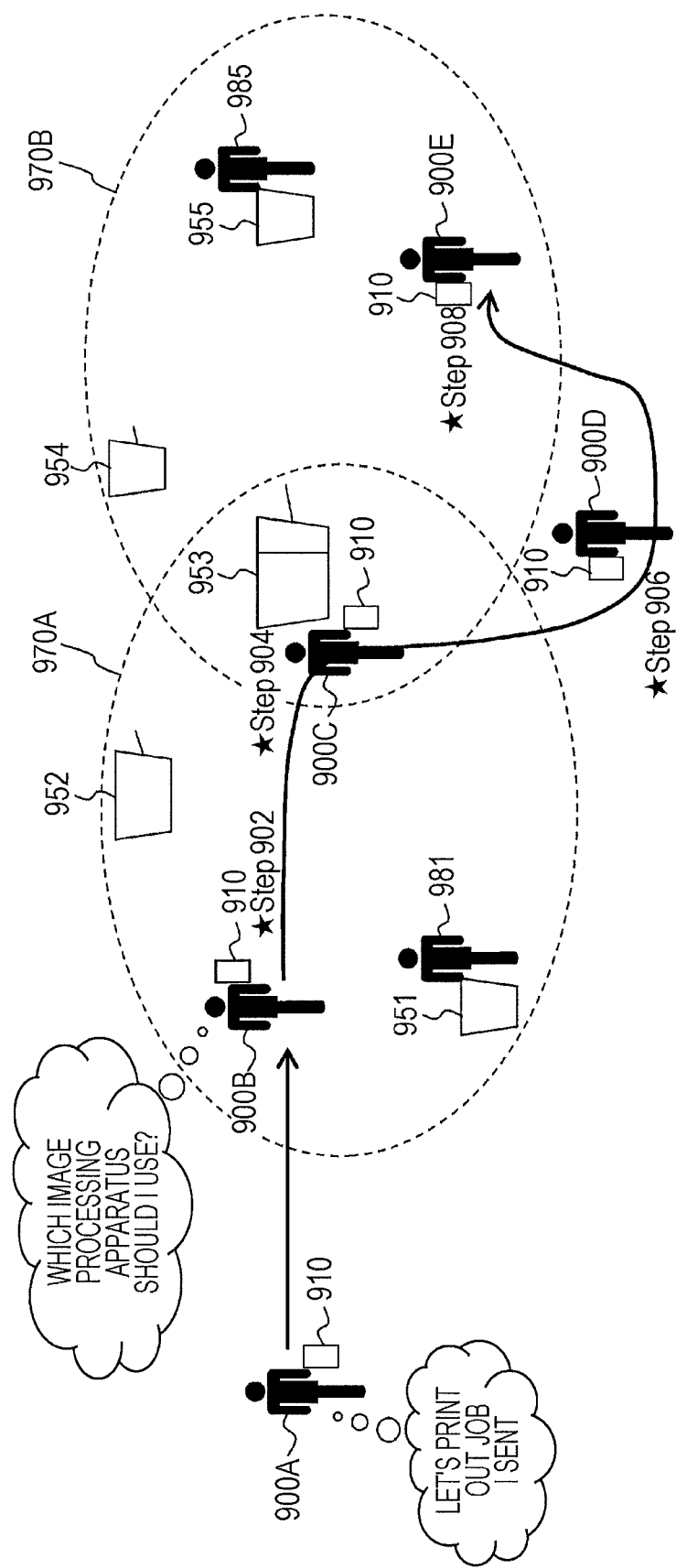
FIG. 9 is an illustrative diagram illustrating an example of a process according to the present exemplary embodiment.

FIG. 9 is an illustrative diagram illustrating an example of a process according to the present exemplary embodiment. FIG. 9 illustrates an example of the case where a user 900 (Mr. Taro FUJI) has moved in an office building where there are plural image processing apparatuses.

An image processing apparatus 951, an image processing apparatus 952, and an image processing apparatus 953 are installed within a WiFi area 970A. The image processing apparatus 953, an image processing apparatus 954, and an image processing apparatus 955 are installed within a WiFi area 970B. The image processing apparatus 951 is being used by a user 981, and the image processing apparatus 955 is being used by a user 985.

Suppose that the user 900 has a mobile device 910 and moves to positions of a user 900A, a user 900B, a user 900C, a user 900D, and a user 900E.

Figure 10A:
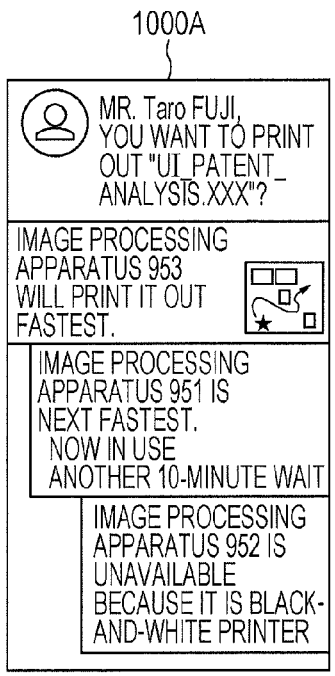
FIGS. 10A to 10E are illustrative diagrams illustrating examples of a process according to the present exemplary embodiment.

The user 900 thinks that "let's print out the job I sent" at the position of the user 900A, and moves to the position of the user 900B. Then, when the user is thinking such as "which image processing apparatus I should use?" at the position of the user 900B, the mobile device 910 displays a screen 1000A illustrated in the example of FIG. 10A (Step 902). The image processing apparatus capable of printing out the job fastest within the WiFi area 970A is presented to the mobile device 910. Specifically, display is performed as in the following.

Mr. Taro FUJI

You want to print out "UI_patent_analysis.xxx"?

(1) The image processing apparatus 953 will print it out fastest. (A route to the image processing apparatus 953 from the current location of the user is displayed on a map.)

(2) The image processing apparatus 951 is next fastest. Now in use. Another 10-minute wait.

(3) The image processing apparatus 952 is unavailable because it is a black-and-white printer.

Note that the "UI_patent_analysis.xxx" is a color document. In addition, in the case where an image processing apparatus located near the user 900 is unavailable in terms of processing performance, reasons for unavailability may also be presented.

Figure 10B:
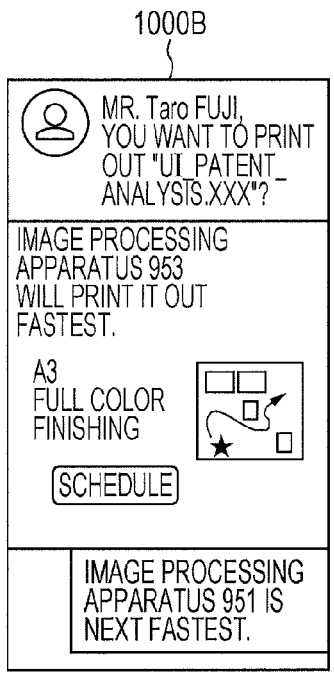

Details of the performance and the like of each printer may also be presented. For example, in the case where the image processing apparatus 953 has been selected on the screen, a screen 1000B illustrated in the example of FIG. 10B is presented to the mobile device 910. Specifically, display is performed as in the following.

Mr. Taro FUJI

You want to print out "UI_patent_analysis.xxx"?

(1) The image processing apparatus 953 will print it out fastest. (The route to the image processing apparatus 953 from the current location of the user is displayed on a map.)

The performance of the image processing apparatus 953 is A3, full color, and finishing. A "schedule" button (2) The image processing apparatus 951 is next fastest.

Figure 10C:
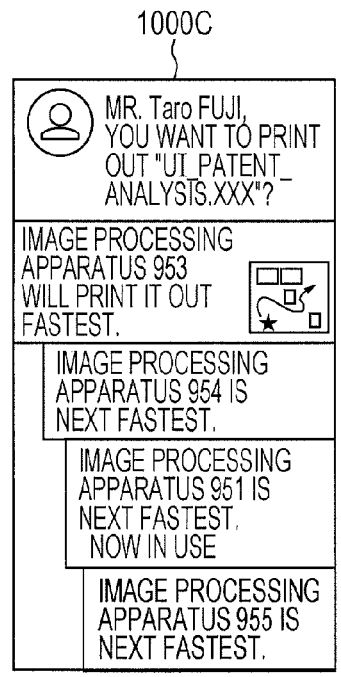

In the case where the user 900 has moved to the position of the user 9000 (the area where both the WiFi areas 970A and 970B are superposed on one another), the mobile device 910 displays a screen 1000C illustrated in the example of FIG. 10C (Step 904). The image processing apparatus capable of printing out the job fastest within both the WiFi areas 970A and 970B is presented to the mobile device 910. Specifically, display is performed as in the following.

Mr. Taro FUJI

You want to print out "UI_patent_analysis.xxx"?

(1) The image processing apparatus 953 will print it out fastest. (A route to the image processing apparatus 953 from the current location of the user is displayed on a map.)

(2) The image processing apparatus 954 is next fastest.

(3) The image processing apparatus 951 is next fastest. Note that, now in use.

(4) The image processing apparatus 955 is next fastest.

Figure 10D:
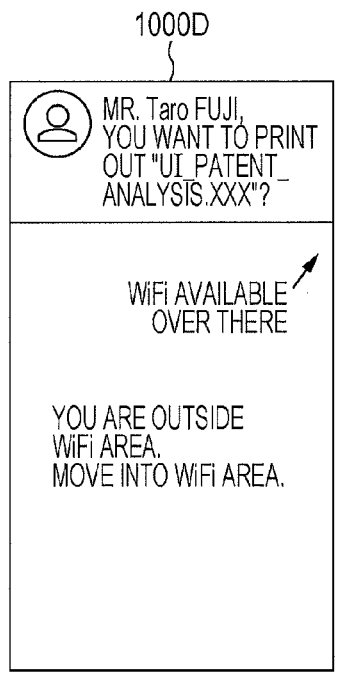

In the case where the user 900 has moved to the position of the user 900D (a position outside the WiFi areas 970A and 970B), the mobile device 910 displays a screen 1000D illustrated in the example of FIG. 10D (Step 906). Specifically, display is performed as in the following.

Mr. Taro FUJI

You want to print out "UI_patent_analysis.xxx"?

WiFi available over there (an arrow is displayed indicating the direction in which a WiFi area is present)

You are outside a WiFi area.

Move into a WiFi area.

Figure 10E:
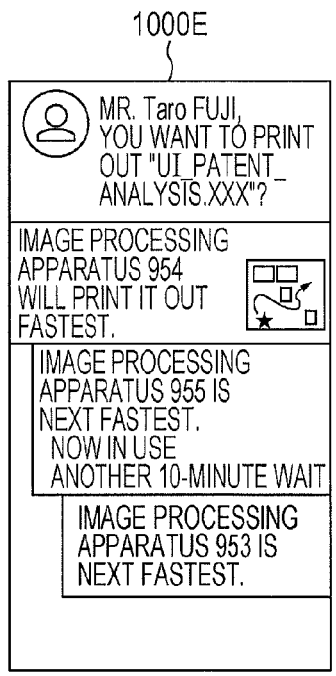

In the case where the user 900 has moved to the position of the user 900E (a region within the WiFi area 970B), the mobile device 910 displays a screen 1000E illustrated in the example of FIG. 10E (Step 908). Specifically, display is performed as in the following.

Mr. Taro FUJI

You want to print out "UI_patent_analysis.xxx"?

(1) The image processing apparatus 954 will print it out fastest. (A route to the image processing apparatus 954 from the current location of the user is displayed on a map.)

(2) The image processing apparatus 955 is next fastest. Note that, now in use. Another 10-minute wait.

(3) The image processing apparatus 953 is next fastest.

The image-processing-apparatus selection module 160 selects image processing apparatuses using a priority-added table 1100. FIG. 11 is an illustrative diagram illustrating an example of a data structure of the priority-added table 1100. The priority-added table 1100 includes an image processing apparatus ID field 1110, a location field 1120, a specs field 1130, a job schedule field 1140, a user-location-vs-image-processing-apparatus-location field 1150, a user's-job-vs-specs field 1160, an estimated-start-time-to-estimated-completion-time field 1170, and an order-of-recommendation field 1180. The image processing apparatus ID field 1110 stores image processing apparatus IDs. The location field 1120 stores the locations where image processing apparatuses having the image processing apparatus IDs are installed. The specs field 1130 stores specs of the image processing apparatuses having the image processing apparatus IDs. The job schedule field 1140 stores job schedules of the image processing apparatuses having the image processing apparatus IDs. The user-location-vs-image-processing-apparatus-location field 1150 stores priority information in terms of distance from the location of the user to the locations of image processing apparatuses. The user's-job-vs-specs field 1160 stores determination results as to whether or not the specs of the image processing apparatuses meet the specs necessary for the user's job. The estimated-start-time-to-estimated-completion-time field 1170 stores estimated start times and estimated completion times obtained if the user's job is processed by the image processing apparatuses. The order-of-recommendation field 1180 stores the order of recommendation of image processing apparatuses selected by the image-processing-apparatus selection module 160. For example, the order of recommendation may be determined in accordance with the order of job completion.

The example of FIG. 11 illustrates the case where the user "Mr. Taro FUJI" has a job "print, A3, color, amount: 40 pages". In this case, FIG. 11 illustrates that a machine 3 is selected as a machine having the highest priority and a machine 1 as a machine having the second highest priority, and that a machine 2 and a machine 4 are inappropriate for the job.

In the case where a target image processing apparatus is a multifunction machine with at least a scan function and a print function, the target image processing apparatus may also perform processing to serve as an image processing apparatus with the scan function and as an image processing apparatus with the print function. In this case, even when another user is using the scan function, it is possible to use the print function. Even when another user is using the print function, it is possible to use the scan function.

Specifically, in the case where the job schedules of the respective image processing apparatuses are managed, for each of the scan function and the print function, a current job and scheduled jobs (including other users' jobs and scheduled jobs) of each image processing apparatus are acquired. Then, a message such as "a person who is going to perform printing is coming now" is displayed on the panel of a certain image processing apparatus that is being used.

In addition, to schedule a job, the job schedules of the respective image processing apparatuses are collected. The use states of the image processing apparatuses are displayed at the mobile device in accordance with the user's command, times available for scheduling a job are displayed, and the user is allowed to schedule the job. The user schedules a job such that the job is performed at the time when the image processing apparatus the user wants to use becomes available. Then, when the time comes, the user is notified by voice, display, or the like and is prompted to start the job. In addition, a message indicating that a certain job is scheduled is displayed on the panel of the image processing apparatus for which the job has been scheduled, and the user who has scheduled the job has priority in using the image processing apparatus.

Figure 12:
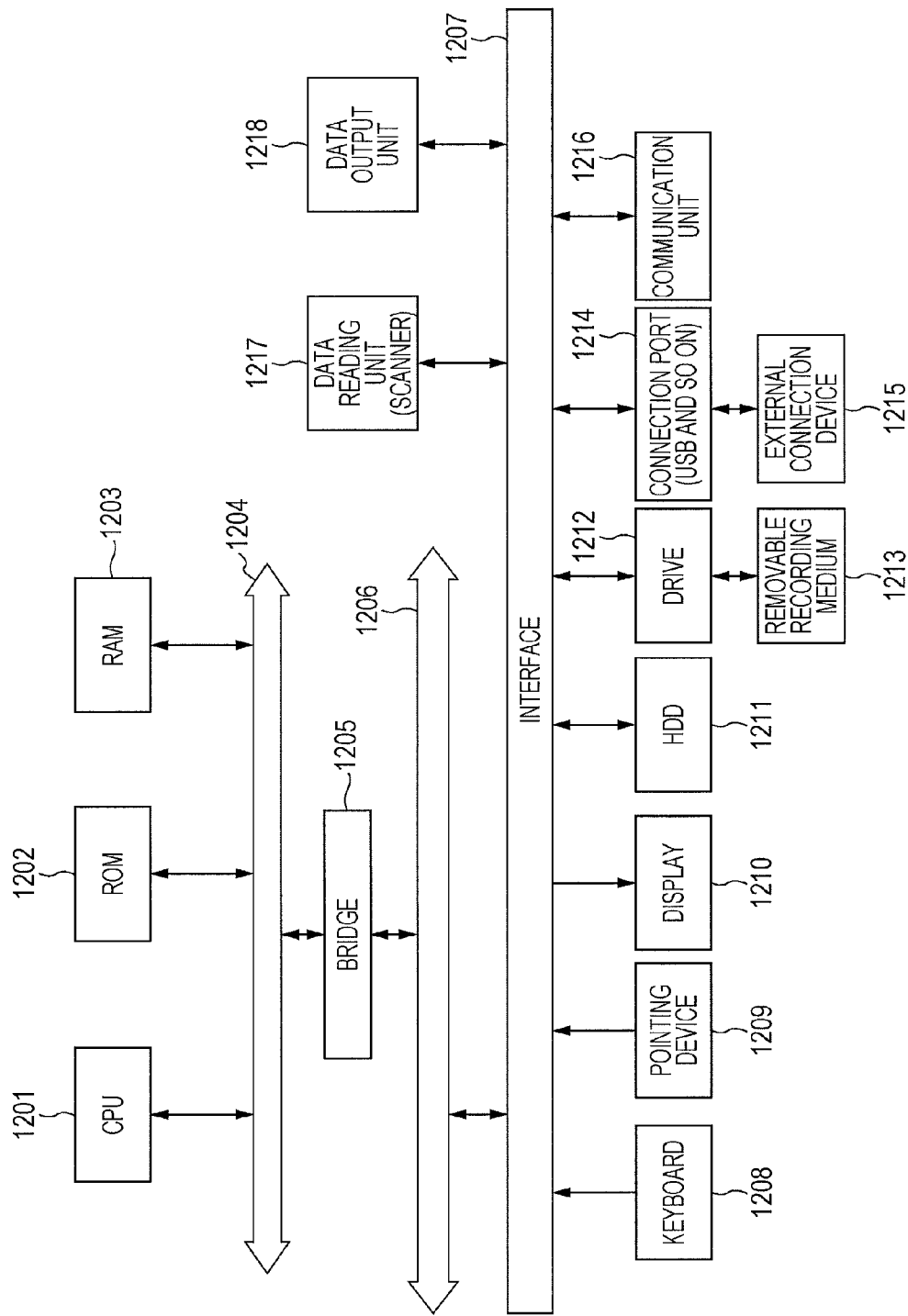
FIG. 12 is a block diagram illustrating an example of a hardware configuration of a computer that realizes the present exemplary embodiment.

An example of a hardware configuration of an information processing apparatus according to the present exemplary embodiment will be described with reference to FIG. 12. The configuration illustrated in FIG. 12 is realized, for example, using a personal computer (PC) or the like, and includes a data reading unit 1217 such as a scanner and a data output unit 1218 such as a printer.

A central processing unit (CPU) 1201 is a controller that performs processing in accordance with a computer program in which the execution sequence of various modules described in the above-described exemplary embodiment are described. The various modules are the mobile device detection module 110, the user identification module 120, the print job detection module 130, the captured-image receiving module 140, the document detection module 150, the image-processing-apparatus selection module 160, the presentation module 170, the image-processing-apparatus use detection module 180, the image-processing-apparatus schedule management module 190, and the like.

A read-only memory (ROM) 1202 stores programs, calculation parameters, and the like used by the CPU 1201. A random-access memory (RAM) 1203 stores programs used during execution of the CPU 1201, parameters that change as appropriate during the execution, and the like. The CPU 1201, the ROM 1202, and the RAM 1203 are connected to one another by a host bus 1204, which includes a CPU bus and the like.

The host bus 1204 is connected to an external bus 1206 such as a Peripheral Component Interconnect/Interface (PCI) bus via a bridge 1205.

A keyboard 1208 and a pointing device 1209 such as a mouse are input devices operated by an operator. A display 1210 is, for example, a liquid crystal display device or a cathode ray tube (CRT), and displays various types of information as text information or image information.

A hard disk drive (HDD) 1211 includes a hard disk, operates the hard disk, and causes the hard disk to record or play back a program executed by the CPU 1201 or information. The hard disk stores the user table 600, the image processing apparatus table 700, the job schedule table 800, the priority-added table 1100, print jobs, and the like. Furthermore, various other types of data, various other computer programs, and the like are stored.

A drive 1212 reads out data or a program recorded in a removable recording medium 1213, which is inserted into the drive 1212, and supplies the data or program to the RAM 1203, which is connected to the drive 1212 via an interface 1207, the external bus 1206, the bridge 1205, and the host bus 1204. The removable recording medium 1213 is a magnetic disk, an optical disc, a magneto-optical disk, a semiconductor memory, or the like. The removable recording medium 1213 is also usable as a data recording region similarly to a hard disk.

A connection port 1214 is a port for connecting an external connection device 1215, and includes connectors for USB, IEEE 1394, and the like. The connection port 1214 is connected to the CPU 1201 and the like via the interface 1207, the external bus 1206, the bridge 1205, the host bus 1204, and the like. A communication unit 1216 is connected to a communication line and performs a process for data communication to and from the outside. The data reading unit 1217 is, for example, a scanner, and performs a document reading process. The data output unit 1218 is, for example, a printer, and performs a document data output process.

Note that the hardware configuration of the information processing apparatus illustrated in FIG. 12 is an exemplary configuration. The configuration of the present exemplary embodiment is not limited to the configuration illustrated in FIG. 12, and has only to be a configuration with which the modules described in the present exemplary embodiment may be executed. For example, some of the modules may be constituted by a dedicated hardware device (for example, an application specific integrated circuit (ASIC), which is an integrated circuit for a specific use, or the like). Some of the modules may be provided in an external system and connected through communication lines. Furthermore, plural such systems illustrated in FIG. 12 may be connected to each other through communication lines and may operate in a cooperative manner. In addition, the hardware configuration of the information processing apparatus may also be installed in a copier, a fax, a scanner, a printer, a multifunction machine, or the like.

Note that the program that has been described may also be stored in a recording medium and provided. Furthermore, the program may also be provided through a communication unit. In that case, for example, the program described above may also be considered as an invention that is a "computer readable recording medium in which a program is recorded".

The "computer readable recording medium in which a program is recorded" is a computer readable recording medium used for installation, execution, distribution, and the like of the program and in which the program is recorded.

Note that examples of the recording medium include a digital versatile disc (DVD), a compact disc (CD), a Blu-ray disc (Blu-ray® Disc), a magneto-optical disk (MO), a flexible disk (FD), a magnetic tape, a hard disk, a read-only memory (ROM), an electrically erasable programmable ROM (EEPROM®), a flash memory, a random access memory (RAM), an SD (Secure Digital) memory card, and the like. DVDs include "a DVD-R, a DVD-RW, a DVD-RAM, and the like" for standards developed by the DVD forum and "a DVD+R, a DVD+RW, and the like" for standards developed by DVD+RW. CDs include a compact disc-read-only memory (CD-ROM), a CD recordable (CD-R), a CD-Rewritable (CD-RW), and the like.

The above-described program or a portion of the program may also be recorded and saved in the above-described recording medium, distributed, or the like. The above-described program or a portion of the program may also be transmitted through communication, for example, through a wired network, a wireless communication network, or a transmission medium such as a combination of a wired network and a wireless communication network or the like. The wired network is used in a local-area network (LAN), a Metropolitan Area Network (MAN), a wide area network (WAN), the Internet, an intranet, an extranet, and the like. Alternatively, the above-described program or a portion of the program may also be transferred by a carrier wave.

Furthermore, the above-described program may also be a portion of another program or may also be recorded in a recording medium together with a separate program. In addition, the above-described program may also be divided and recorded in plural recording mediums. In addition, the above-described program may also be recorded in any format such as a compressed format, an encrypted format and the like, as long as the above-described program may be reconstructed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus having a processor configured to configured to implement:
   a detector configured to detect that a user has a document from an image of the user;
   a selector configured to select, in a case where it is detected by the detector that the user has a document, at least one preferred candidate image processing apparatus with an image reading function among at least one candidates within a predetermined distance from the user; and
   a notifier configured to notify the user of the at least one preferred candidate image processing apparatus selected by the selection unit.

2. The information processing apparatus according to claim 1, further comprising:
   an identifier configured to identify the user,
   wherein in a case where there is a print command issued by the user identified by the identifier, the selector selects an image processing apparatus with processing performance indicated by the print command.

3. The information processing apparatus according to claim 2, wherein
   the image processing apparatus has the image reading function and an image output function, and
   in a case where an image processing apparatus with an image reading function is to be selected, the selector treats, as a selection target, an image processing apparatus whose image output function is in use but whose image reading function is not in use, or in a case where an image processing apparatus with an image output function is to be selected, the selector treats, as a selection target, an image processing apparatus whose image reading function is in use but whose image output function is not in use.

4. The information processing apparatus according to claim 3, wherein
   in a case where the user has a mobile terminal apparatus, the identifier receives information with which the identifier is capable of identifying the user from the mobile terminal apparatus, and
   the notifier notifies the mobile terminal apparatus of the at least one preferred candidate.

5. The information processing apparatus according to claim 2, wherein
   in a case where the user has a mobile terminal apparatus, the identifier receives information with which the identifier is capable of identifying the user from the mobile terminal apparatus, and
   the notifier notifies the mobile terminal apparatus of the at least one preferred candidate.

6. The information processing apparatus according to claim 1, wherein
   the image processing apparatus has the image reading function and an image output function, and
   in a case where an image processing apparatus with an image reading function is to be selected, the selector treats, as a selection target, an image processing apparatus whose image output function is in use whose image reading function is not in use, or in a case where an image processing apparatus with an image output function is to be selected, the selector treats, as a selection target, an image processing apparatus whose image reading function is in use but whose image output function is not in use.

7. The information processing apparatus according to claim 1, further comprising:
   a display, wherein the display is configured to display an estimated time of job of the user and an image processing apparatus for each of the at least one preferred candidates.

8. The information processing apparatus according to claim 7, wherein the display is configured to display the at least one preferred candidates sorted by an estimated time of job of the user.

9. The information processing apparatus according to claim 1, further comprising:
 a display, wherein the display is configured to display the at least one preferred candidates, and the at least one preferred candidates are sorted by a distance between respective image processing apparatus and the user.

10. The information processing apparatus according to claim 1, wherein when the selector selects an image processing apparatus among the at least one preferred candidates, the user is notified by a light or sound on the selected image processing apparatus.

11. An information processing method comprising using a processor to perform the following functions:
 detecting that a user has a document from an image of the user;
 selecting, in a case where it is detected that the user has a document, at least one preferred candidate image processing apparatus with an image reading function among at least one candidates within a predetermined distance from the user; and
 presenting to the user the at least one preferred candidate image processing apparatus by the processor.

12. A non-transitory computer readable medium storing a program causing a computer to execute a process, the process comprising:
 detecting that a user has a document from an image of the user;
 selecting, in a case where it is detected that the user has a document, at least one preferred candidate image processing apparatus with an image reading function among at least one candidates within a predetermined distance from the user; and
 presenting to the user the at least one preferred candidate image processing apparatus selected by the processor.

\* \* \* \* \*